W. GOSSHORN.
Flour-Bolts.

No. 143,821. Patented Oct. 21, 1873.

Witnesses:
E. Wolff
Sedgwick

Inventor:
W. Gosshorn
Per
Attorneys.

UNITED STATES PATENT OFFICE.

WILLIAM GOSSHORN, OF WATERLOO, PENNSYLVANIA.

IMPROVEMENT IN FLOUR-BOLTS.

Specification forming part of Letters Patent No. 143,821, dated October 21, 1873; application filed July 19, 1873.

*To all whom it may concern:*

Figure 1:
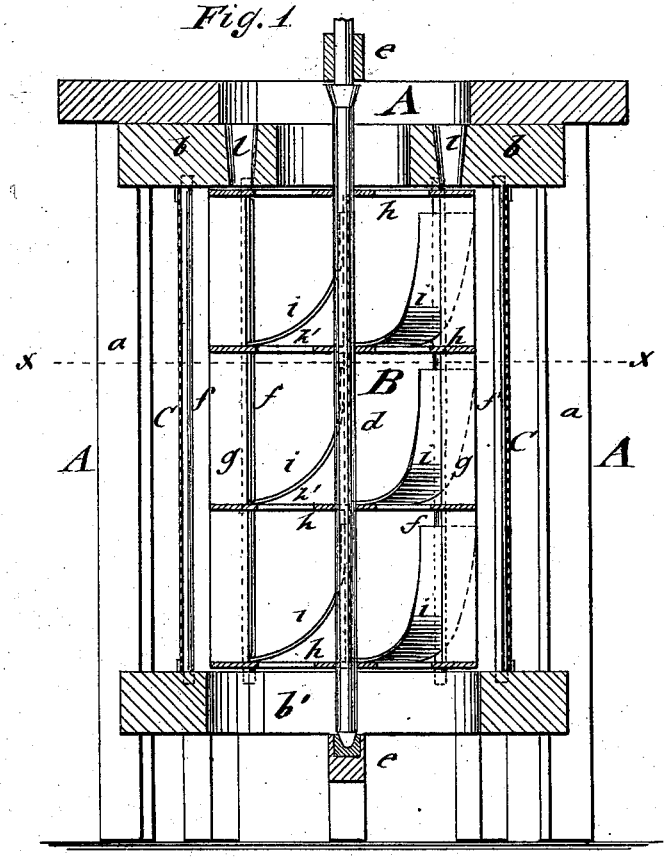
Figure 2:
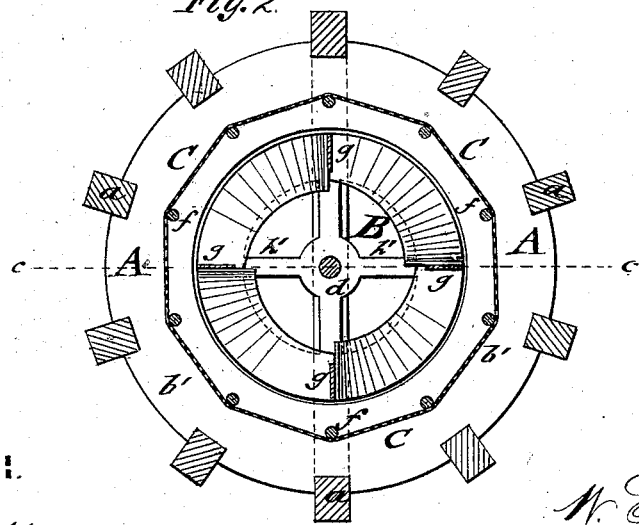

Be it known that I, WILLIAM GOSSHORN, of Waterloo, in the county of Juniata and State of Pennsylvania, have invented a new and Improved Flour-Bolt, of which the following is a specification:

In the accompanying drawing, Figure 1 represents a vertical central section of my improved upright flour-bolt on the line $c\ c$, Fig. 2; and Fig. 2, a horizontal section of the same on the line $x\ x$, Fig. 1.

Similar letters of reference indicate corresponding parts.

The object of my invention is to improve the old reel-bolt in such a manner that the flour is cooled in bolting, so as to be fit for immediate packing; that it bolts faster and cleaner, and requires less cloth, which lasts longer time, as no middlings or bran remains in the bolt, offering thereby less opportunity for injury or destruction by insects. My invention consists in arranging the flour-bolt in upright position, with stationary cloth, and a fan with straight and curved partitions.

In the drawing, A represents the frame of the flour-bolt, which consists of upright pieces $a$ and circular top and bottom parts $b\ b'$. The central shaft $d$ of fan B turns in suitable top and bottom bearings $e$, and is equidistant from upright rods $f$, around which the cloth C is tightly stretched, forming between top and bottom part $b\ b'$ cloth of polygonal shape. The fan B is made of straight vertical parts $g$, circular parts $h$ with radial arms $h'$, and curved parts $i$, which extend downward in each section formed by the vertical and circular partitions. The meal is introduced to it by apertures $l$ of the top part $b$, and bolted by the centrifugal force imparted by the rotation of fan B, the bran passing out through the open bottom $b'$.

The distribution of the flour in bolting brings it in contact with the air, so that it cools at the same time. The flour is also bolted a great deal faster and cleaner than with the old reels, as no clogging can take place in the fan-bolt. No flour, middlings, or bran settles in the cloth or bolt on account of its upright position; consequently moths or insects have no chance to cut and destroy the stationary cloth, so that it lasts a considerably longer period of time than the cloth on the old reels, which are cut by the insects in a short time in getting at the unbolted flour which settles therein.

Having thus described my invention, I claim as new and desire to secure by Letters Patent—

The rotary fans $g\ h\ h'\ i$ on vertical shaft, combined with a stationary vertical cloth, C, as and for the purpose described.

WILLIAM GOSSHORN.

Witnesses:
   J. M. MORRISON,
   E. MONTGOMERY.